(12) United States Patent
Singh et al.

(10) Patent No.: US 12,344,049 B2
(45) Date of Patent: Jul. 1, 2025

(54) SYSTEM FOR AUTO-LOCATION OF TIRES EMPLOYING FOOTPRINT LENGTH

(71) Applicant: The Goodyear Tire & Rubber Company, Akron, OH (US)

(72) Inventors: Kanwar Bharat Singh, Copley, OH (US); Sparsh Sharma, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 148 days.

(21) Appl. No.: 18/503,607

(22) Filed: Nov. 7, 2023

(65) Prior Publication Data

US 2024/0149622 A1     May 9, 2024

Related U.S. Application Data

(60) Provisional application No. 63/382,749, filed on Nov. 8, 2022.

(51) Int. Cl.
    *B60C 23/04*     (2006.01)
    *G07C 5/00*     (2006.01)

(52) U.S. Cl.
    CPC .......... *B60C 23/0416* (2013.01); *G07C 5/008* (2013.01)

(58) Field of Classification Search
    CPC ................................................ B60C 23/0416
    See application file for complete search history.

(56) References Cited

U.S. PATENT DOCUMENTS

| | | | |
|---|---|---|---|
| 4,157,530 A | 6/1979 | Merz | |
| 4,361,202 A | 11/1982 | Minovitch | |
| 4,936,138 A | 6/1990 | Cushman et al. | |
| (Continued) | | | |

FOREIGN PATENT DOCUMENTS

| | | |
|---|---|---|
| EP | 0494763 B1 | 5/1996 |
| EP | 2586633 A1 | 5/2013 |
| (Continued) | | |

OTHER PUBLICATIONS

Bonnie et al., Method and Device for determining the position of pressure sensors in a tire pressure monitoring system, Clarivate Analytics, 2008, 49 pages, 2008.

*Primary Examiner* — Peter D Nolan
(74) *Attorney, Agent, or Firm* — Edward T. Kennedy

(57) ABSTRACT

An auto-location system locates a position of a tire. A tire sensor unit is mounted on the tire and measures a length of a footprint of the tire, and electronic memory capacity stores identification information for the tire sensor unit. A vehicle sensor unit is mounted on the vehicle and measures a lateral acceleration and a longitudinal acceleration. A processor is in electronic communication with the tire sensor unit and the vehicle sensor unit, and receives the measured footprint length, the identification information, the lateral acceleration, and the longitudinal acceleration. A virtual footprint length estimator employs the lateral acceleration and the longitudinal acceleration to estimate a virtual footprint length of the tire. A correlation module receives the virtual footprint length and the measured footprint length to generate correlation values. A decision arbitrator applies a set of decision rules to the correlation values to generate a wheel position indication.

20 Claims, 7 Drawing Sheets

(56) References Cited

U.S. PATENT DOCUMENTS

| | | |
|---|---|---|
| 6,434,399 B1 | 8/2002 | Kamperschroer |
| 6,463,798 B2 | 10/2002 | Niekerk et al. |
| 6,489,888 B1 | 12/2002 | Honeck et al. |
| 6,725,712 B1 | 4/2004 | King et al. |
| 6,750,761 B1 | 6/2004 | Newman |
| 6,879,252 B2 | 4/2005 | Dezorzi et al. |
| 6,885,282 B2 | 4/2005 | Desai et al. |
| 6,885,296 B2 | 4/2005 | Hardman et al. |
| 6,941,803 B2 | 9/2005 | Hirohama et al. |
| 6,952,160 B1 | 10/2005 | Bennie et al. |
| 7,010,968 B2 | 3/2006 | Stewart et al. |
| 7,131,323 B2 | 11/2006 | Hirota |
| 7,177,739 B2 | 2/2007 | Kuchler |
| 7,355,509 B2 | 4/2008 | Rennie et al. |
| 7,367,227 B2 * | 5/2008 | Stewart ............... B60C 23/0489 73/146 |
| 7,385,485 B2 | 6/2008 | Thomas et al. |
| 7,423,532 B2 | 9/2008 | Stewart et al. |
| 7,425,892 B2 | 9/2008 | Mori et al. |
| 7,506,540 B1 | 3/2009 | Job |
| 7,750,798 B2 | 7/2010 | Mori |
| 7,768,383 B2 * | 8/2010 | Fink ..................... B60C 23/007 340/447 |
| 7,839,273 B2 | 11/2010 | Tabe |
| 7,948,364 B2 | 5/2011 | Lin et al. |
| 8,188,848 B2 | 5/2012 | Lange et al. |
| 8,204,645 B2 * | 6/2012 | Weston ................ B60C 23/009 701/33.9 |
| 8,217,776 B2 | 7/2012 | Hyde |
| 8,332,103 B2 | 12/2012 | Greer et al. |
| 8,380,460 B2 | 2/2013 | Miller et al. |
| 8,396,629 B1 | 3/2013 | Kim et al. |
| 8,463,491 B2 * | 6/2013 | Weston ................ B60C 23/0488 701/33.1 |
| 8,498,759 B1 * | 7/2013 | Juzswik ............. B60C 23/0488 701/10 |
| 8,498,785 B2 | 7/2013 | Juzswik |
| 8,577,643 B2 | 11/2013 | Kuchler |
| 8,584,517 B2 | 11/2013 | Strahan |
| 8,626,413 B2 | 1/2014 | Kammann |
| 8,659,411 B2 | 2/2014 | Fink |
| 8,843,267 B2 | 9/2014 | Park et al. |
| 9,162,542 B2 | 10/2015 | Shima et al. |
| 9,180,742 B2 | 11/2015 | Kosugi et al. |
| 9,248,708 B2 * | 2/2016 | Fink ..................... B60C 23/007 |
| 9,259,978 B2 | 2/2016 | Patel et al. |
| 9,278,589 B2 | 3/2016 | Laifenfeld et al. |
| 9,399,376 B2 | 7/2016 | Lickfelt et al. |
| 9,440,501 B2 | 9/2016 | Huang et al. |
| 9,463,673 B2 | 10/2016 | Huang et al. |
| 9,469,166 B2 | 10/2016 | Mcintyre et al. |
| 9,584,881 B2 | 2/2017 | Taki |
| 9,769,305 B2 | 9/2017 | Banerjee et al. |
| 9,783,011 B2 | 10/2017 | Taki |
| 9,802,447 B2 | 10/2017 | Petrucelli |
| 9,851,227 B2 | 12/2017 | Lammers |
| 9,937,759 B2 | 4/2018 | Terada et al. |
| 9,950,577 B1 | 4/2018 | Marlett et al. |
| 9,973,831 B2 | 5/2018 | Mejegård et al. |
| 10,006,799 B2 | 6/2018 | Hanson et al. |
| 10,046,608 B2 * | 8/2018 | Haas .................. B60C 23/0489 |
| 10,075,819 B2 | 9/2018 | Santavicca et al. |
| 10,081,317 B2 | 9/2018 | Naboulsi |
| 10,082,381 B2 | 9/2018 | McMillen |
| 10,093,138 B2 | 10/2018 | Decia et al. |
| 10,131,320 B2 | 11/2018 | Schmotzer et al. |
| 10,132,719 B2 | 11/2018 | Fudulea |
| 10,237,690 B2 | 3/2019 | Thakur et al. |
| 10,442,253 B2 | 10/2019 | Werner et al. |
| 10,479,300 B2 | 11/2019 | Wheeler et al. |
| 10,549,587 B2 * | 2/2020 | Kollmitzer ............ B60C 23/061 |
| 10,685,510 B2 | 6/2020 | Linsmeier et al. |
| 10,717,330 B2 * | 7/2020 | Cyllik ................. B60C 23/0416 |
| 10,726,714 B2 | 7/2020 | Sekizawa et al. |
| 10,780,749 B2 | 9/2020 | Hassani et al. |
| 11,173,757 B2 * | 11/2021 | Cyllik .................. B60C 23/009 |
| 2002/0092345 A1 | 7/2002 | Van et al. |
| 2005/0179530 A1 * | 8/2005 | Stewart ............... B60C 23/0488 340/447 |
| 2008/0143507 A1 | 6/2008 | Cotton et al. |
| 2008/0150712 A1 | 6/2008 | Cooprider et al. |
| 2009/0002146 A1 | 1/2009 | Lin |
| 2009/0066498 A1 | 3/2009 | Jongsma et al. |
| 2009/0299570 A1 | 12/2009 | Kammann |
| 2010/0063669 A1 | 3/2010 | Fink et al. |
| 2010/0191409 A1 * | 7/2010 | Weston ............... B60C 23/0416 701/29.6 |
| 2011/0071737 A1 | 3/2011 | Greer et al. |
| 2011/0282548 A1 | 11/2011 | Haas |
| 2011/0308310 A1 * | 12/2011 | Strahan ............... B60C 23/0488 73/146.5 |
| 2011/0313623 A1 * | 12/2011 | Greer .................. B60C 23/0437 701/49 |
| 2012/0022801 A1 * | 1/2012 | Miller .................... G01M 17/06 702/42 |
| 2012/0029767 A1 * | 2/2012 | Bailie ................. B60C 23/0416 701/36 |
| 2012/0112899 A1 * | 5/2012 | Hannon ............. B60C 23/0489 340/445 |
| 2012/0133498 A1 | 5/2012 | Nah et al. |
| 2012/0242502 A1 * | 9/2012 | Steiner .................... G08C 17/02 340/870.07 |
| 2012/0259507 A1 * | 10/2012 | Fink .................... B60C 23/0416 701/32.7 |
| 2014/0002257 A1 | 1/2014 | Han et al. |
| 2014/0379231 A1 | 12/2014 | Hawes et al. |
| 2015/0352912 A1 * | 12/2015 | Lehmann ............ B60C 23/007 340/442 |
| 2016/0039365 A1 | 2/2016 | Vanderwall |
| 2016/0129736 A1 | 5/2016 | Peine et al. |
| 2017/0106706 A1 | 4/2017 | Bettecken et al. |
| 2017/0174014 A1 | 6/2017 | Stewart et al. |
| 2018/0074490 A1 | 3/2018 | Park |
| 2019/0126694 A1 | 5/2019 | Stewart et al. |
| 2019/0244301 A1 | 8/2019 | Seth et al. |
| 2020/0101802 A1 | 4/2020 | Nasser et al. |
| 2020/0346500 A1 | 11/2020 | Zeng et al. |
| 2020/0369100 A1 | 11/2020 | Pierre et al. |
| 2020/0398617 A1 | 12/2020 | Kandler et al. |
| 2021/0208028 A1 | 7/2021 | Boisset et al. |
| 2022/0176968 A1 | 6/2022 | Brooks |
| 2022/0230481 A1 | 7/2022 | Singh et al. |

FOREIGN PATENT DOCUMENTS

| | | |
|---|---|---|
| WO | 2002057097 A3 | 7/2002 |
| WO | 2006100577 A1 | 9/2006 |
| WO | 2006104484 A1 | 10/2006 |
| WO | 2008116683 A1 | 10/2008 |
| WO | 2013139977 A1 | 9/2013 |
| WO | 2017018700 A1 | 2/2017 |
| WO | 2019092052 A1 | 5/2019 |
| WO | 2019243374 A1 | 12/2019 |
| WO | 2020053901 A1 | 3/2020 |
| WO | 2020123812 A1 | 6/2020 |

* cited by examiner

SYSTEM FOR AUTO-LOCATION OF TIRES EMPLOYING FOOTPRINT LENGTH

FIELD OF THE INVENTION

The invention relates generally to tire monitoring systems. More particularly, the invention relates to systems that include sensors mounted on vehicle tires to measure tire parameters. Specifically, the invention is directed to a system for locating the position of a tire on a vehicle by correlating a footprint length measured by a sensor mounted on the tire with an estimated footprint length of the tire.

BACKGROUND OF THE INVENTION

Sensors have been mounted on vehicle tires to monitor certain tire parameters, such as pressure and temperature. Systems that include sensors which monitor tire pressure are often known in the art as tire pressure monitoring systems (TPMS). For example, a tire may have a TPMS sensor that transmits a pressure signal to a processor, which generates a low pressure warning when the pressure of the tire falls below a predetermined threshold. It is desirable that systems including pressure sensors be capable of identifying the specific tire that is experiencing low air pressure, rather than merely alerting the vehicle operator or a fleet manager that one of the vehicle tires is low in pressure.

The process of identifying which sensor sent a particular signal and, therefore, which tire may have low pressure, is referred to as auto-location or localization. Effective and efficient auto-location or localization is a challenge in TPMS, as tires may be replaced, rotated, and/or changed between summer and winter tires, altering the position of each tire on the vehicle. Additionally, power constraints typically make frequent sensor communications and auto-location or localization of signal transmissions impractical.

Prior art techniques to achieve signal auto-location or localization have included various approaches. For example, low frequency (LF) transmitters have been installed in the vicinity of each tire, two-axis acceleration sensors have been employed to recognize a rotation direction of the tire for left or right tire location determination, and methods distinguishing front tires from rear tires using radio frequency (RF) signal strength have been used. The prior art techniques have deficiencies that make location of a sensor mounted in a tire on a vehicle either expensive or susceptible to inaccuracies. In addition, some prior art techniques may be undesirably complex and/or difficult to execute.

As a result, there is a need in the art for a system that provides economical and accurate identification of the location of a position of a tire on a vehicle.

SUMMARY OF THE INVENTION

According to an aspect of an exemplary embodiment of the invention, an auto-location system for locating a position of a tire supporting a vehicle is provided. The system includes a tire sensor unit that is mounted on the tire. The tire sensor unit includes a footprint length measurement sensor to measure a length of a footprint of the tire, and electronic memory capacity to store identification information for the tire sensor unit. A vehicle sensor unit is mounted on the vehicle and measures a lateral acceleration of the vehicle and a longitudinal acceleration of the vehicle. A processor is in electronic communication with the tire sensor unit and the vehicle sensor unit, and receives the measured footprint length, the identification information, the lateral acceleration, and the longitudinal acceleration. A virtual footprint length estimator is executed on the processor, and employs the lateral acceleration and the longitudinal acceleration to estimate a virtual footprint length of the tire. A correlation module is executed on the processor, and receives the virtual footprint length and the measured footprint length to generate correlation values. A decision arbitrator is executed on the processor. The decision arbitrator applies a set of decision rules to the correlation values to generate a wheel position indication that correlates the tire sensor unit to a position of the tire on the vehicle.

BRIEF DESCRIPTION OF THE DRAWINGS

The invention will be described by way of example and with reference to the accompanying drawings, in which.

Similar numerals refer to similar parts throughout the drawings.

Definitions

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figure 1:
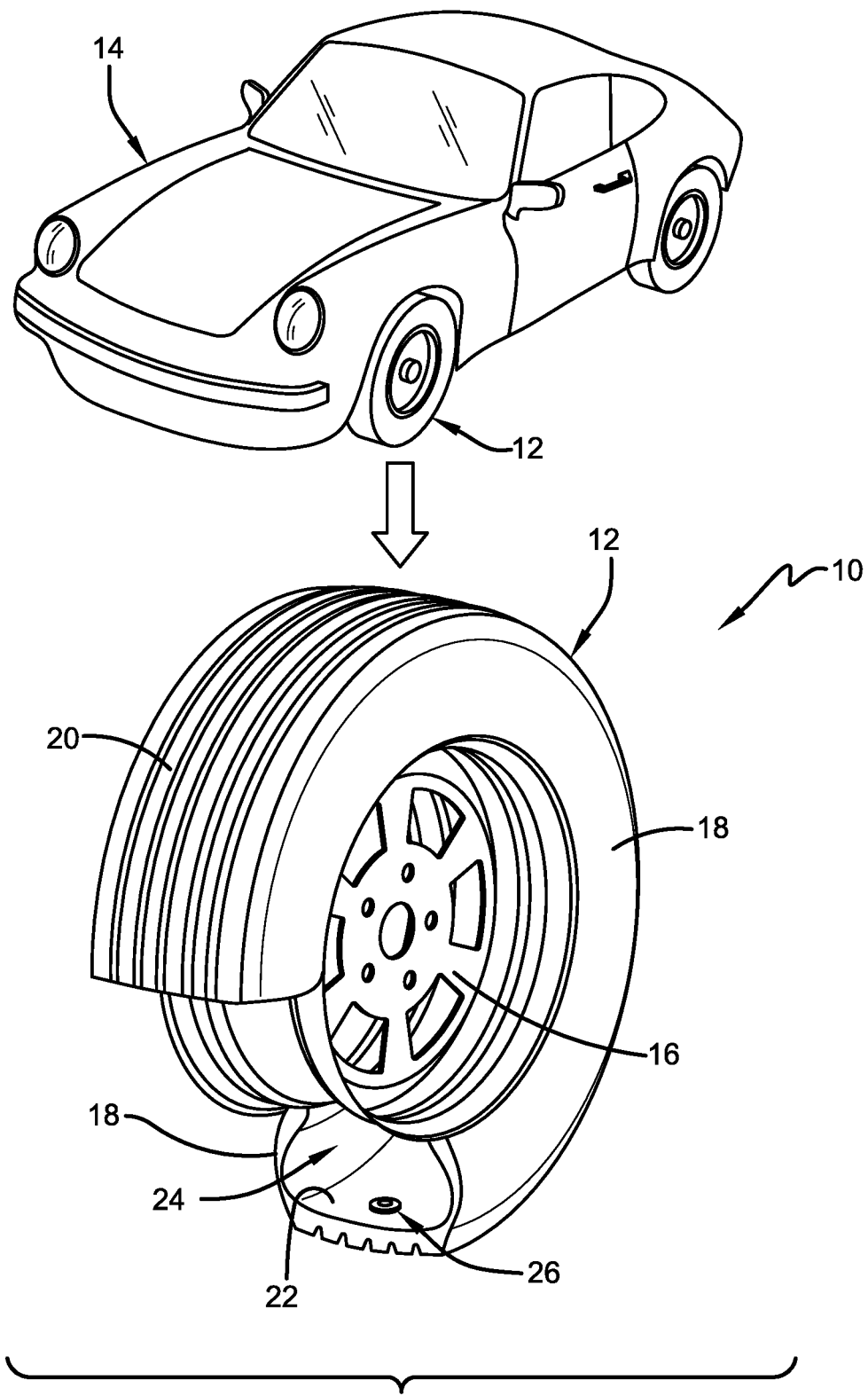
FIG. 1 is a schematic perspective view of a vehicle that includes tires employing an exemplary embodiment of the auto-location system of the present invention.

With reference to FIGS. 1 through 8, an exemplary embodiment of an auto-location system of the present invention is indicated at 10. With particular reference to FIG. 1, the system 10 locates the position of each tire 12 supporting a vehicle 14. The position of each tire 12 on the vehicle 14 shall be referred to herein by way of example as front left position 12a, front right position 12b, rear left position 12c, and rear right position 12d. While the vehicle 14 is depicted as a passenger car, the invention is not to be so restricted. The principles of the invention find application in other vehicle categories, such as commercial trucks, off-the-road vehicles, and the like, in which vehicles may be supported by more or fewer tires than those shown in FIG. 1.

The tires 12 are of conventional construction, and each tire is mounted on a respective wheel 16 as known to those skilled in the art. Each tire 12 includes a pair of sidewalls 18 that extend to a circumferential tread 20. An innerliner 22 is disposed on the inner surface of the tire 12, and when the tire is mounted on the wheel 16, an internal cavity 24 is formed, which is filled with a pressurized fluid, such as air.

A tire sensor unit 26 is attached to the innerliner 22 of each tire 12 by means such as an adhesive, and measures certain parameters or conditions of the tire as will be described in greater detail below. It is to be understood that the tire sensor unit 26 may be attached in such a manner, or to other components of the tire 12, such as on or in one of the sidewalls 18, on or in the tread 20, on the wheel 16, and/or a combination thereof. For the purpose of convenience, reference herein shall be made to mounting of the tire sensor unit 26 on the tire 12, with the understanding that such mounting includes all such types of attachment.

A respective tire sensor unit 26 is mounted on each tire 12 for the purpose of detecting certain real-time tire parameters, such as tire pressure and tire temperature. For this reason, the tire sensor unit 26 preferably includes a pressure sensor and a temperature sensor, and may be of any known configuration. The tire sensor unit 26 may be referred to as a tire pressure monitoring system (TPMS) sensor. The tire sensor unit 26 preferably also includes electronic memory capacity for storing identification (ID) information for the tire sensor unit, known as sensor ID information 92, which includes a unique identifying number or code for each tire sensor unit. In the art, the phrase tire ID is sometimes used interchangeably with sensor ID information 92, and reference herein shall be made to sensor ID information for the purpose of convenience.

Figure 2:
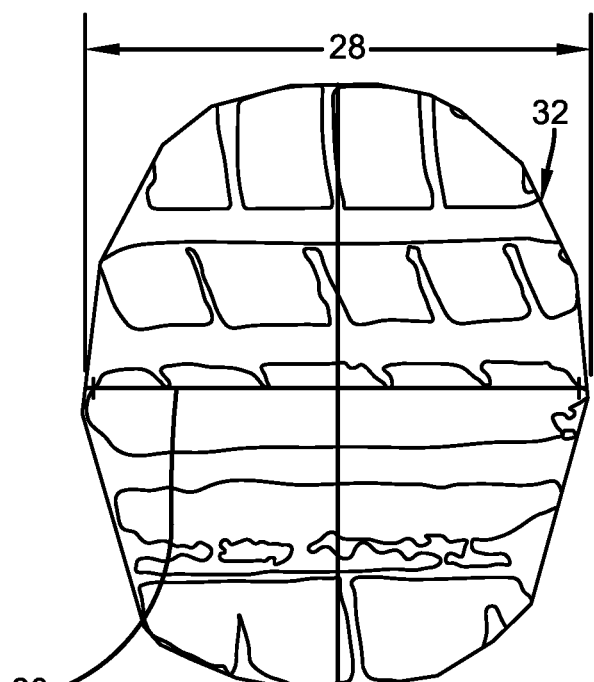
FIG. 2 is a plan view of a footprint of a tire shown in FIG. 1.

Turning to FIG. 2, the tire sensor unit 26 (FIG. 1) preferably also measures a length 28 of a centerline 30 of a footprint 32 of the tire 12. More particularly, as the tire 12 contacts the ground, the area of contact created by the tread 20 with the ground is known as the footprint 32. The centerline 30 of the footprint 32 corresponds to the equatorial centerplane of the tire 12, which is the plane that is perpendicular to the axis of rotation of the tire and which passes through the center of the tread 20. The tire sensor unit 26 thus measures the length 28 of the centerline 30 of the tire footprint 32, which is referred to herein as the measured footprint length 28. Any suitable technique for measuring the measured footprint length 28 may be employed by the tire sensor unit 26. For example, the tire sensor unit 26 may include a strain sensor or piezoelectric sensor that measures deformation of the tread 20 and thus indicates the measured footprint length 28. Preferably, each measured footprint length 28 is associated with the sensor ID information 92 of the particular tire sensor unit 26 that obtained the measured footprint length.

Figure 4:
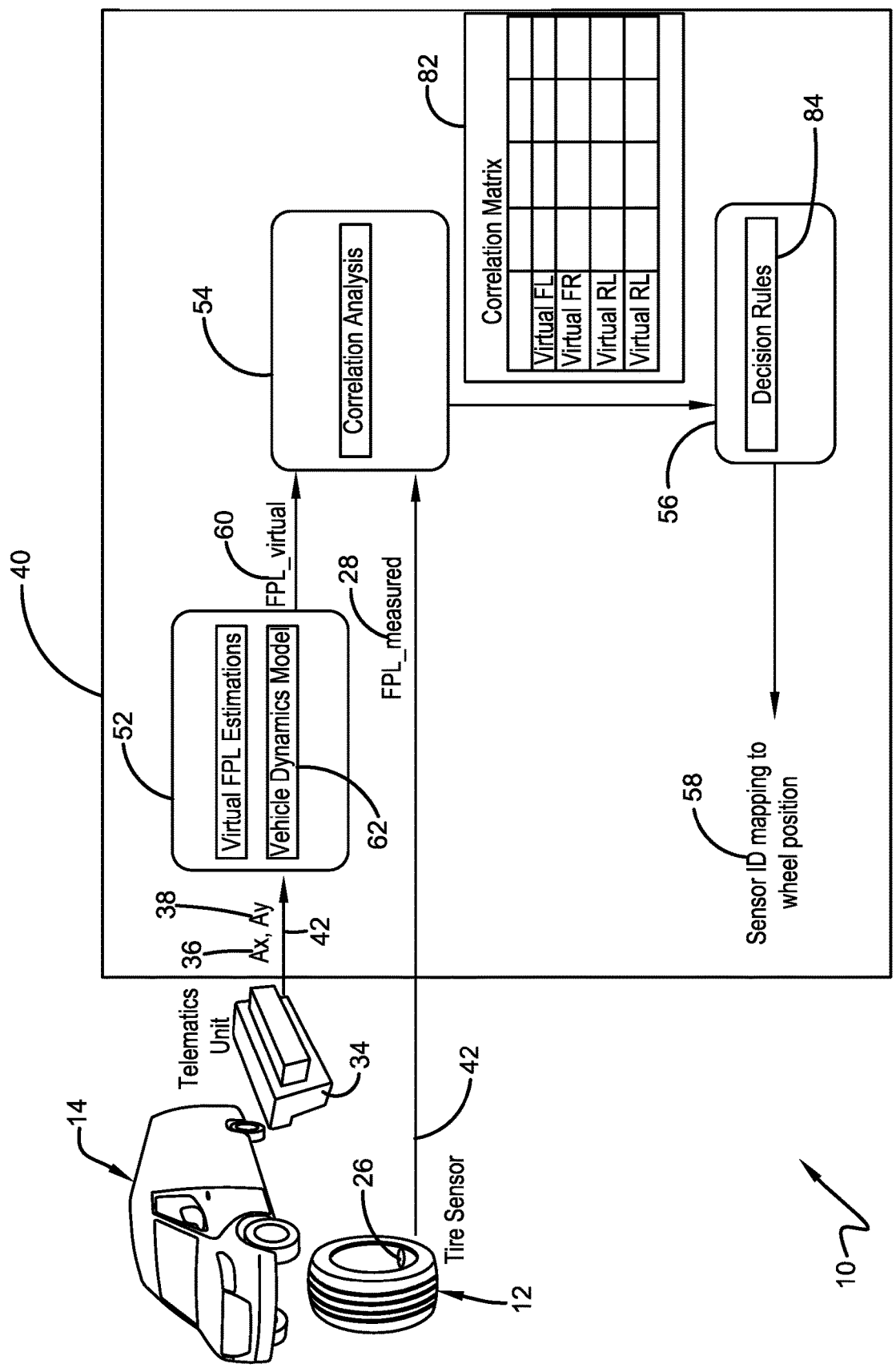
FIG. 4 is a schematic diagram of aspects of an exemplary embodiment of the auto-location system of the present invention.

As shown in FIG. 4, a vehicle sensor unit 34 preferably is mounted on the vehicle 14 to measure a lateral acceleration 36 of the vehicle and a longitudinal acceleration 38 of the vehicle. The vehicle sensor unit 34 may include a telematics unit that is equipped with an inertial measurement unit (IMU), which is attached to the vehicle 14 to measure the lateral acceleration 36 and longitudinal acceleration 38.

Figure 3:
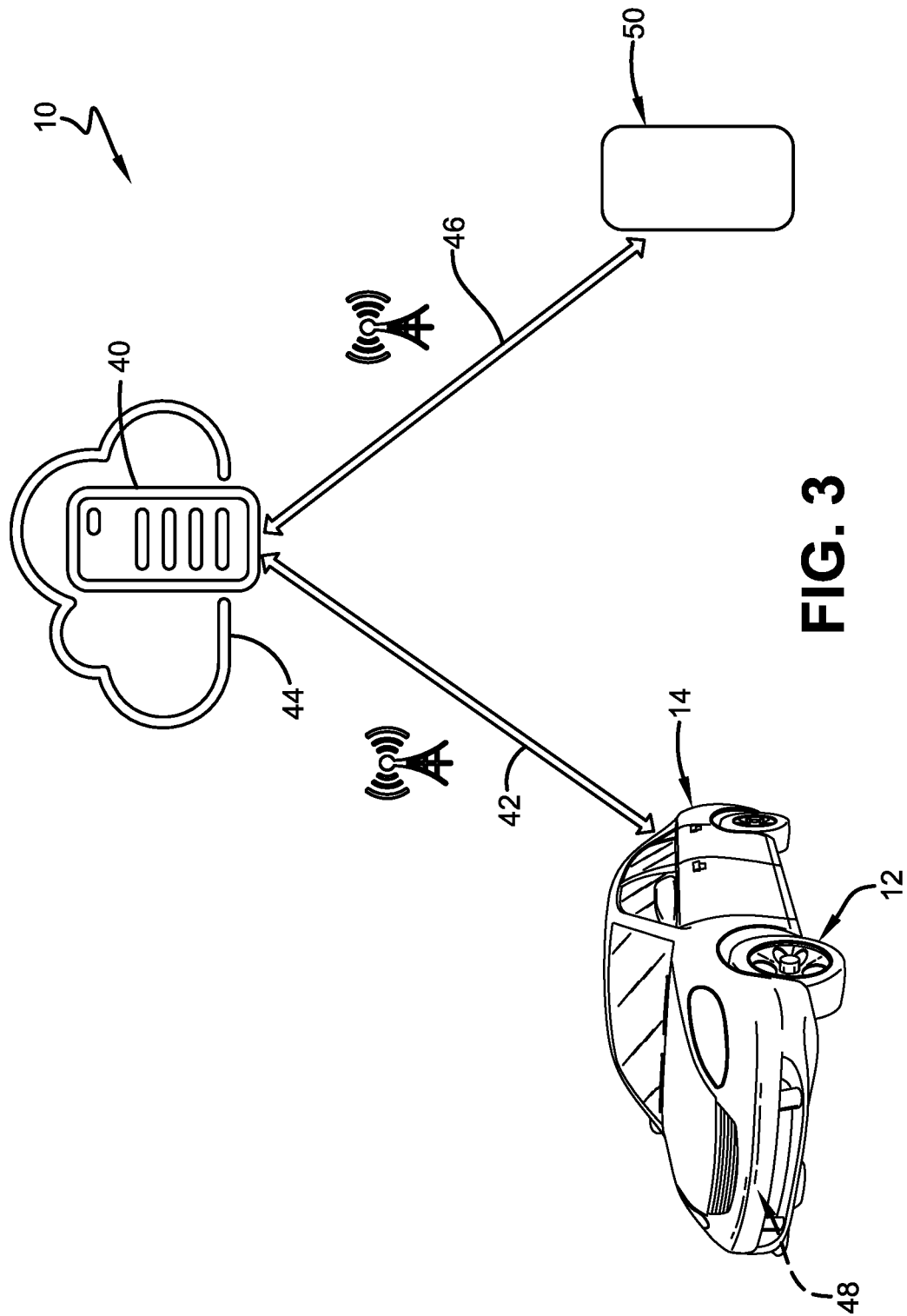
FIG. 3 is a schematic representation of data transmission to a cloud-based server and to a display device.

With reference to FIG. 3, aspects of the auto-location system 10 preferably are executed on a processor 40. The processor 40 enables input of parameters and execution of specific techniques, to be described below, which are stored in a suitable storage medium and are in electronic communication with the processor. The processor 40 may be mounted on the vehicle 14, or may be a remote processor in a cloud-based server 44.

The tire sensor unit 26 (FIG. 1) preferably includes wireless transmission means 42, such as an antenna, for wirelessly sending the measured footprint length 28 and the sensor ID information 92 to the processor 40. The vehicle sensor unit 34 (FIG. 4) preferably also includes wireless transmission means 42, such as an antenna, for wirelessly sending the lateral acceleration 36 and the longitudinal acceleration 38 to the processor 40.

Output from the auto-location system 10 may be wirelessly transmitted by an antenna 46 from the processor 40 to a display device 50. By way of example, the display device 50 may include a device that is accessible to a user of the vehicle 14 or a technician for the vehicle, such as a smartphone, and/or a device that is accessible to a fleet manager, such as a computer. Output from the auto-location system 10 may also be wirelessly transmitted from the processor 40 to an electronic control system 48 of the vehicle 14.

Turning to FIG. 4, in the auto-location system 10, the measured footprint length 28 is transmitted from the tire sensor unit 26 to the processor 40, and the lateral acceleration 36 and the longitudinal acceleration 38 are transmitted from the vehicle sensor unit 34 to the processor. The auto-location system 10 includes a virtual footprint length estimator 52, a correlation module 54, and a decision arbitrator 56 to generate a wheel position indication 58, as will be described in greater detail below.

The footprint length estimator 52 is in electronic communication with and is executed on the processor 40. The vehicle acceleration data, including the lateral acceleration 36 and the longitudinal acceleration 38, as measured over a predetermined window of time, are electronically communicated or transmitted to the footprint length estimator 52. The footprint length estimator 52 employs the lateral acceleration 36 and the longitudinal acceleration 38 to estimate a virtual footprint length 60 of the tire 12.

To estimate the virtual footprint length 60, the footprint length estimator 52 executes a vehicle dynamics model 62. The vehicle dynamics model 62 receives the lateral acceleration 36 and the longitudinal acceleration 38 as inputs and generates an estimate of the corresponding lateral and longitudinal load transfer of the vehicle 14, as well as an estimate of a total load 64 (FIG. 5) at each tire 12 of the vehicle 14. Exemplary vehicle dynamics models 62 are described in U.S. Pat. Nos. 9,752,962; 9,663,115; and 9,222,854, all of which are owned by the same Assignee as the current invention, The Goodyear Tire & Rubber Company, and which are hereby incorporated by reference.

Figure 5:
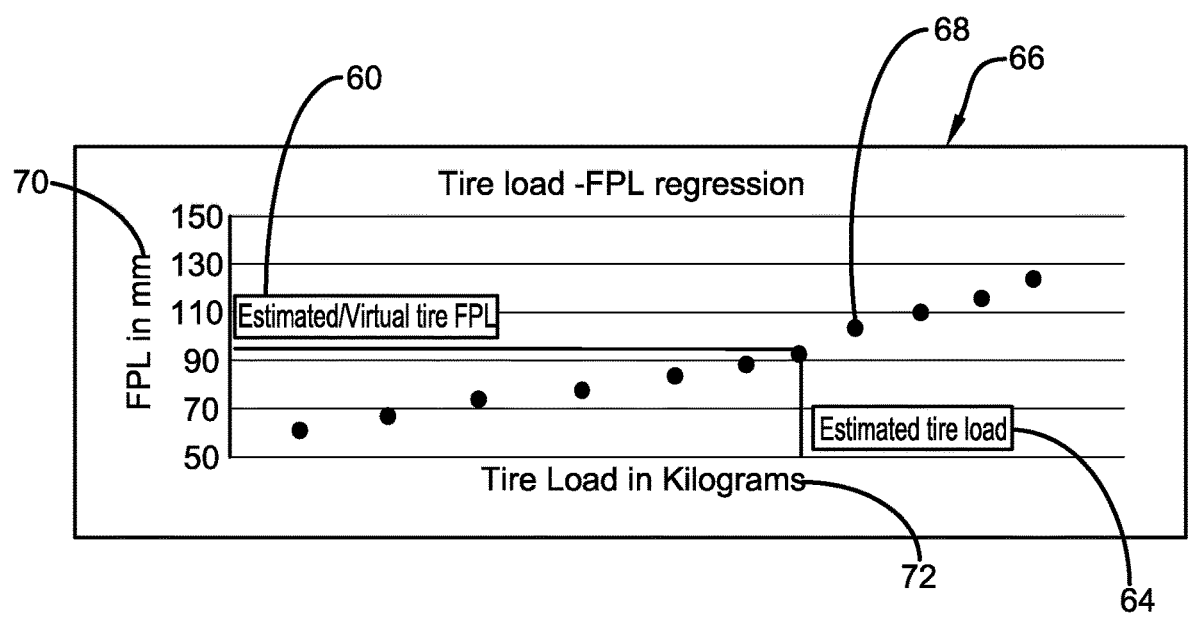
FIG. 5 is a plot of a regression according to an aspect of the auto-location system shown in FIG. 4.

With additional reference to FIG. 5, once the estimate of the tire load 64 is generated, the virtual footprint length 60 of each tire 12 is generated. Preferably, the virtual footprint length 60 is estimated with a regression model 66. In the regression model 66, a predetermined plot 68 of footprint length data 70 versus tire load data 72, which may be determined from earlier testing, is employed. The estimated tire load 64 from the vehicle dynamics model 62 is correlated in the plot 68 to determine the estimate of the virtual footprint length 60.

Returning to FIG. 4, the correlation module 54, which is in electronic communication with and is executed on the processor 40, receives the virtual footprint length 60 from the footprint length estimator 52 and the measured footprint length 28 as measured by the tire sensor unit 26. The correlation module 54 correlates a set of virtual footprint lengths 60 with a corresponding set of measured footprint lengths 28 for each tire 12 on the vehicle 14. More particularly, the correlation module 54 executes a statistical correlation of the virtual footprint length 60 for each of the front left 12*a*, front right 12*b*, rear left 12*c*, and rear right 12*d* tire positions with the measured footprint lengths 28 for each of the front left, front right, rear left, and rear right tire positions.

Figure 6:
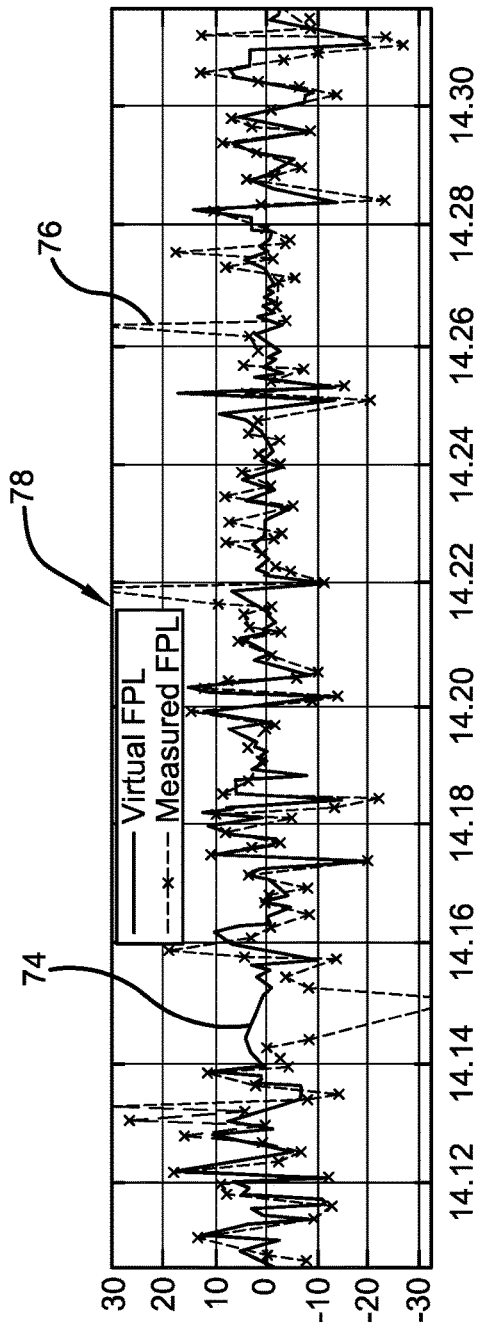
FIG. 6 is a graphical representation of a correlation according to an aspect of the auto-location system shown in FIG. 4.
Figure 7:
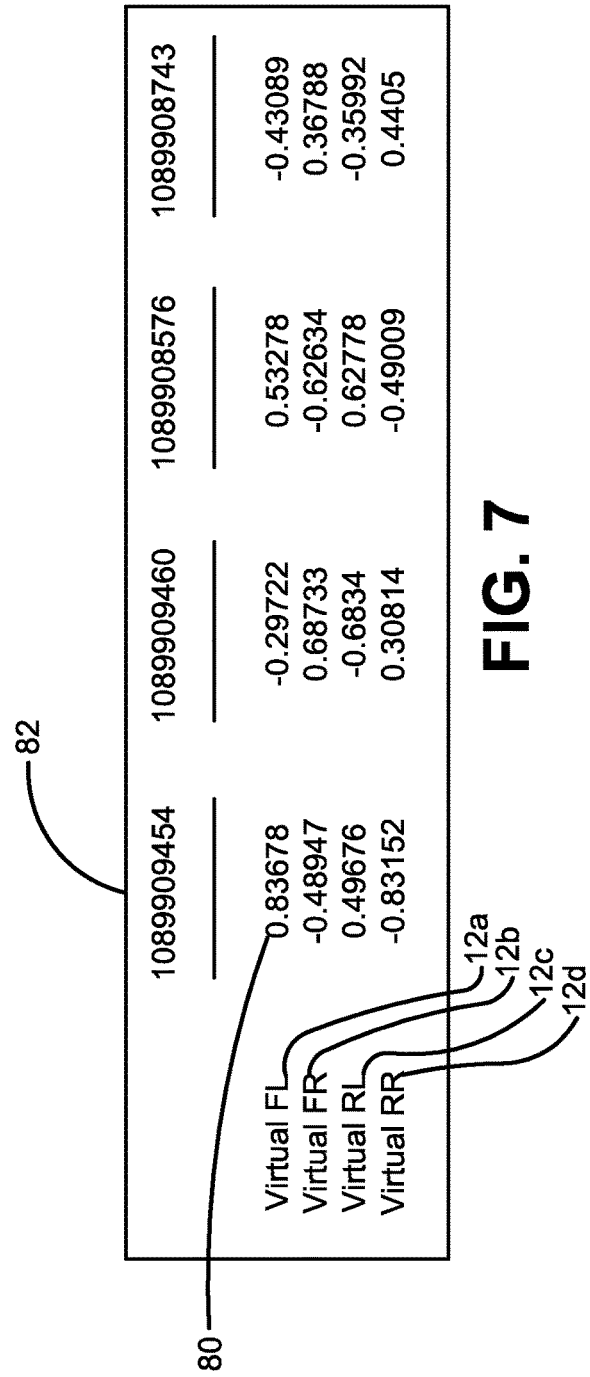
FIG. 7 is a correlation matrix according to an aspect of the auto-location system shown in FIG. 4.

With additional reference to FIGS. 6 and 7, an exemplary correlation between a plot line 74 for the virtual footprint length 60 of a tire 12 with a plot line 76 for the measured footprint length 28 of the tire is shown in a correlation plot 78. For a vehicle 14 with four (4) tires 12, sixteen (16) total correlations preferably are performed, as the virtual footprint length 60 for each of the four (4) positions of front left 12*a*, front right 12*b*, rear left 12*c*, and rear right 12*d* is correlated with the measured footprint length 28 for each of the four (4) positions. The resulting correlation values 80 preferably are stored in a correlation matrix 82, which is stored on and/or is in electronic communication with the processor 40.

Figure 8:
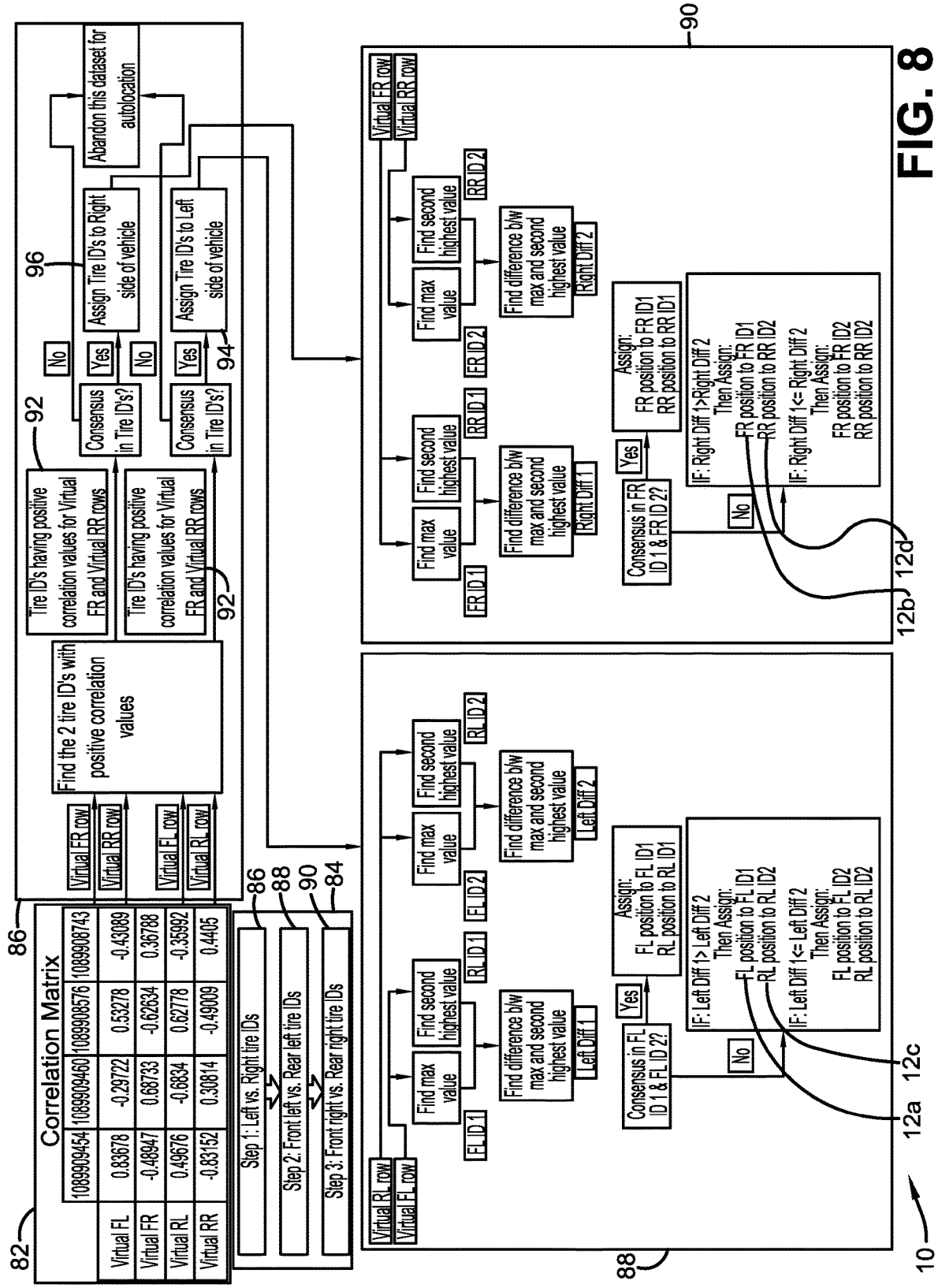
FIG. 8 is a schematic diagram of decision rules according to an aspect of the auto-location system shown in FIG. 4.

Referring to FIGS. 4 and 8, the correlation matrix 82 is input into the decision arbitrator 56, which is in electronic communication with and is executed on the processor 40. The decision arbitrator 56 includes a set of decision rules 84 that are preferably applied in sequence to the correlation values 80 of the correlation matrix 82 to assign each respective tire sensor unit 26 to a tire mounting position of front left 12*a*, front right 12*b*, rear left 12*c*, and rear right 12*d* on the vehicle 14. As described above, each measured footprint length 28 is associated with the sensor ID information 92 of the particular tire sensor unit 26 that obtained the measured footprint length.

The decision rules 84 preferably include a first rule 86 that identifies the left side positions 12*a*, 12*c* and the right side positions 12*b*, 12*d*. The decision arbitrator 56 compares the virtual footprint length 60 for the front left position 12*a* and the virtual footprint length for the rear left position 12*c* to the measured footprint lengths 28 in the correlation matrix 82. The measured footprint lengths 28 that yield a positive correlation with the virtual footprint length 60 for the front left position 12*a* and the virtual footprint length for the rear left position 12*c* enables the tire sensor units 26 for those measured footprint lengths, through the sensor ID information 92, to be designated as left side positions 94.

The decision arbitrator 56 compares the virtual footprint length 60 for the front right position 12*b* and the virtual footprint length for the rear right position 12*d* to the measured footprint lengths 28 in the correlation matrix 82. The measured footprint lengths 28 that yield a positive correlation with the virtual footprint length 60 for the front right position 12*b* and the virtual footprint length for the rear right position 12*d* enables the tire sensor units 26 for those measured footprint lengths, through the sensor ID information 92, to be designated as right side positions 96.

The decision rules 84 preferably include a second rule 88 that differentiates between the front left position 12*a* and the rear left position 12*c*. The decision arbitrator 56 compares the virtual footprint length 60 for the front left position 12*a* and the virtual footprint length for the rear left position 12*c* to the measured footprint lengths 28 of the designated left side positions 94. The tire sensor unit 26, through the sensor ID information 92, having the maximum correlation value in the Virtual FL row in the correlation matrix 82 is designated as the front left position 12*a* ID1, which is a first estimate for the identification of the tire 12 mounted in the front left position. The remaining tire sensor unit 26, through the sensor ID information 92, is designated as the rear left position 12*c* ID1, which is a first estimate for the identification of the tire 12 mounted in the rear left position. In a second estimate, the tire sensor unit 26, through the sensor ID information 92, having the maximum correlation value in the Virtual RL row in the correlation matrix 82 is designated as the rear left position 12*c* ID2. The remaining tire sensor unit 26, through the sensor ID information 92, is designated as the front left position 12*a* ID2.

If the sensor ID information 92 for the tire sensor unit 26 designated in the front left position 12*a* is the same in the first estimate and the second estimate, that tire sensor unit is finally designated as the front left position, and the remaining tire sensor unit is finally designated as the rear left position 12*c*. If the sensor ID information 92 for the tire sensor unit 26 designated in the front left position 12*a* is not the same in the first estimate and the second estimate, a determination is made as to whether a difference between the maximum correlation value and the second highest correlation value in the Virtual FL row in the correlation matrix 82 is greater than a difference between the maximum correlation value and the second highest correlation value in the Virtual RL row. If it is greater, the designation of front left position 12*a* and rear left position 12*c* from the first estimate is used as the final designation. If it is less or equal, the designation of front left position 12*a* and rear left position 12*c* from the second estimate is used as the final designation.

The decision rules 84 preferably include a third rule 90, which differentiates between the front right position 12*b* and the rear right position 12*d*. The decision arbitrator 56 compares the virtual footprint length 60 for the front right position 12*b* and the virtual footprint length for the rear right position 12*d* to the measured footprint lengths 28 of the designated right side positions 96. The tire sensor unit 26, through the sensor ID information 92, having the maximum correlation value in the Virtual FR row in the correlation matrix 82 is designated as the front right position 12*b* ID1, which is a first estimate for the identification of the tire 12 mounted in the front right position. The remaining tire sensor unit 26, through the sensor ID information 92, is designated as the rear right position 12*d* ID1, which is a first estimate for the identification of the tire 12 mounted in the rear right position. In a second estimate, the tire sensor unit 26, through the sensor ID information 92, having the maximum correlation value in the Virtual RR row in the correlation matrix 82 is designated as the rear right position 12*d* ID2. The remaining tire sensor unit 26, through the sensor ID information 92, is designated as the front right position 12*b* ID2.

If the sensor ID information 92 for the tire sensor unit 26 designated in the front right position 12*b* is the same in the first estimate and the second estimate, that tire sensor unit is finally designated as the front right position, and the remaining tire sensor unit is finally designated as the rear right position 12*d*. If the sensor ID information 92 for the tire sensor unit 26 designated in the front right position 12*b* is not the same in the first estimate and the second estimate, a determination is made as to whether a difference between the maximum correlation value and the second highest correlation value in the Virtual FR row in the correlation matrix 82 is greater than a difference between the maximum correlation value and the second highest correlation value in the Virtual RR row. If it is greater, the designation of front right position 12*b* and rear right position 12*d* from the first estimate is used as the final designation. If it is less or equal, the designation of front right position 12*b* and rear right position 12*d* from the second estimate is used as the final designation.

The decision rules 84 thus identify which tire sensor unit 26 is mounted in each respective position of front left 12*a*, front right 12*b*, rear left 12*c*, and rear right 12*d* on the vehicle 14, which is expressed as the wheel position indication 58. The wheel position indication 58 may be transmitted to a display device 50 and/or may be transmitted to an electronic control system 48 of the vehicle 14, as described above.

In this manner, the auto-location system 10 of the present invention employs correlation of a measured footprint length 28 as measured by a tire sensor unit 26 mounted on each tire 12 with an estimated footprint length 60 of the tire to identify the position of each tire sensor unit and thus each tire on the vehicle 14. The system 10 provides economical and accurate identification of the location of each tire 12 on the vehicle 14 with an approach that is agnostic as to the vehicle platform and/or tire identification numbers, such as stock keeping unit (SKU) numbers.

The present invention also includes a method for locating the position of a tire 12 on a vehicle 14. The method includes steps in accordance with the description that is presented above and shown in FIGS. 1 through 8.

It is to be understood that the structure and method of the above-described auto-location system may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. An auto-location system, the system locating a position of a tire supporting a vehicle, the system comprising:
   a tire sensor unit being mounted on the tire, the tire sensor unit including a footprint length measurement sensor to measure a length of a footprint of the tire, and electronic memory capacity to store identification information for the tire sensor unit;
   a vehicle sensor unit being mounted on the vehicle, the vehicle sensor unit measuring a lateral acceleration of the vehicle and a longitudinal acceleration of the vehicle;
   a processor in electronic communication with the tire sensor unit and the vehicle sensor unit, the processor receiving the measured footprint length, the identification information, the lateral acceleration, and the longitudinal acceleration;
   a virtual footprint length estimator executed on the processor, the footprint length estimator employing the lateral acceleration and the longitudinal acceleration to estimate a virtual footprint length of the tire;
   a correlation module executed on the processor, the correlation module receiving the virtual footprint length and the measured footprint length to generate correlation values; and
   a decision arbitrator executed on the processor, the decision arbitrator applying a set of decision rules to the correlation values to generate a wheel position indication that correlates the tire sensor unit to a position of the tire on the vehicle.

2. The auto-location system of claim 1, wherein the virtual footprint length estimator executes a vehicle dynamics model in which the model receives the lateral acceleration and the longitudinal acceleration as inputs and generates an estimate of lateral and longitudinal load transfer of the vehicle and an estimate of tire load.

3. The auto-location system of claim 2, wherein the virtual footprint length of the tire is estimated with a regression model once the estimate of tire load is generated.

4. The auto-location system of claim 1, wherein the correlation module correlates a set of virtual footprint lengths with a corresponding set of measured footprint lengths for each tire on the vehicle.

5. The auto-location system of claim 1, wherein the correlation values are stored in a correlation matrix.

6. The auto-location system of claim 1, wherein the decision rules include a plurality of rules, and the decision arbitrator applies the decision rules in sequence.

7. The auto-location system of claim 6, wherein the decision rules include a first rule that identifies left side positions on the vehicle and right side positions on the vehicle.

8. The auto-location system of claim 7, wherein the decision arbitrator compares a virtual footprint length for a front left position and a virtual footprint length for a rear left position to measured footprint lengths in the correlation values.

9. The auto-location system of claim 8, wherein tire sensor units generating measured footprint lengths that yield a positive correlation with the virtual footprint length for the front left position and the virtual footprint length for the rear left position are designated as left side positions.

10. The auto-location system of claim 7, wherein the decision arbitrator compares a virtual footprint length for a front right position and a virtual footprint length for a rear right position to measured footprint lengths in the correlation values.

11. The auto-location system of claim 10, wherein tire sensor units generating measured footprint lengths that yield a positive correlation with the virtual footprint length for the front right position and the virtual footprint length for the rear right position are designated as right side positions.

12. The auto-location system of claim 7, wherein the decision rules include a second rule that differentiates between a front left position and a rear left position.

13. The auto-location system of claim 12, wherein the decision arbitrator compares a virtual footprint length for the front left position and a virtual footprint length for the rear left position to measured footprint lengths of the left side positions.

14. The auto-location system of claim 13, wherein the decision arbitrator executes a first estimate among the correlation values to identify the tire mounted in at least one of the front left position and the rear left position.

15. The auto-location system of claim 14, wherein the decision arbitrator executes a second estimate among the correlation values to identify the tire mounted in at least one of the front left position and the rear left position.

16. The auto-location system of claim 7, wherein the decision rules include a third rule that differentiates between a front right position and a rear right position.

17. The auto-location system of claim 16, wherein the decision arbitrator compares a virtual footprint length for the front right position and a virtual footprint length for the rear right position to measured footprint lengths of the right side positions.

18. The auto-location system of claim 17, wherein the decision arbitrator executes a first estimate among the correlation values to identify the tire mounted in at least one of the front right position and the rear right position.

19. The auto-location system of claim 18, wherein the decision arbitrator executes a second estimate among the correlation values to identify the tire mounted in at least one of the front right position and the rear right position.

20. The auto-location system of claim 1, wherein the processor is located in at least one of the vehicle and a cloud-based server.

* * * * *